(12) United States Patent
Kim et al.

(10) Patent No.: US 10,599,258 B2
(45) Date of Patent: Mar. 24, 2020

(54) WIRED ELECTRODE FOR TOUCHSCREEN PANEL, TOUCHSCREEN PANEL USING THE SAME AND MANUFACTURING METHOD OF THE SAME

(71) Applicant: MIRAENANOTECH CO., LTD., Cheongju (KR)

(72) Inventors: Tae Il Kim, Cheongju (KR); Jung Ho Yun, Anyang (KR)

(73) Assignee: Miraenanotech Co., Ltd., Cheongju (KR)

( * ) Notice: Subject to any disclaimer, the term of this patent is extended or adjusted under 35 U.S.C. 154(b) by 16 days.

(21) Appl. No.: 16/052,475

(22) Filed: Aug. 1, 2018

(65) Prior Publication Data

US 2018/0373383 A1    Dec. 27, 2018

Related U.S. Application Data

(63) Continuation of application No. 14/914,820, filed as application No. PCT/KR2014/007242 on Aug. 5, 2014, now Pat. No. 10,133,395.

(30) Foreign Application Priority Data

Aug. 29, 2013  (KR) .......................... 10-2013-0103489
Jun. 3, 2014   (KR) .......................... 10-2014-0067614

(51) Int. Cl.
  *G06F 3/041*   (2006.01)
  *G06F 3/044*   (2006.01)
(52) U.S. Cl.
  CPC ............ *G06F 3/0416* (2013.01); *G06F 3/044* (2013.01); *G06F 2203/04103* (2013.01)

(58) Field of Classification Search
  None
  See application file for complete search history.

(56) References Cited

U.S. PATENT DOCUMENTS

| 2009/0189877 | A1* | 7/2009 | Washino | ................. G06F 3/045 345/174 |
| 2009/0262094 | A1* | 10/2009 | Lin | ......................... G06F 3/045 345/174 |

(Continued)

FOREIGN PATENT DOCUMENTS

| CN | 102016768 A | 4/2011 |
| CN | 202771407 u | 3/2013 |

(Continued)

OTHER PUBLICATIONS

International Search Report for International Patent Application No. PCT/KR2014/007242 filed Aug. 5, 2014.

*Primary Examiner* — Matthew Yeung

(57) ABSTRACT

Provided are a wired electrode that can reduce a resistance generated in a signal line and reduce occurrence of disconnection, and a touch screen panel and a manufacturing method thereof. The wired electrode for the touch screen panel includes a contact unit electrically connected to one end of an electrode pattern generating a touch signal; a bonding unit configured to transmit the touch signal detected in the electrode pattern by contacting an external driving circuit; and a signal line unit configured by a plurality of first signal lines connected to the contact unit and a plurality of second signal lines connected between the plurality of first signal lines and the bonding unit to connect the contact unit and the bonding unit.

6 Claims, 21 Drawing Sheets

(56) References Cited

U.S. PATENT DOCUMENTS

| | | | | |
|---|---|---|---|---|
| 2012/0293457 A1* | 11/2012 | Agari | ............... | G06F 3/044 345/174 |
| 2012/0313880 A1* | 12/2012 | Geaghan | ............... | G06F 3/044 345/173 |
| 2012/0327021 A1* | 12/2012 | Ryu | ............... | G06F 3/044 345/174 |
| 2013/0187871 A1 | 7/2013 | Kurashima | | |
| 2015/0177878 A1* | 6/2015 | Cheng | ............... | G06F 3/044 345/174 |

FOREIGN PATENT DOCUMENTS

| | | |
|---|---|---|
| KR | 1020120101969 A | 9/2012 |
| KR | 1020120138485 A | 12/2012 |
| KR | 1020130016651 A | 2/2013 |
| WO | 2012015177 A2 | 2/2012 |

* cited by examiner

[FIG. 1]
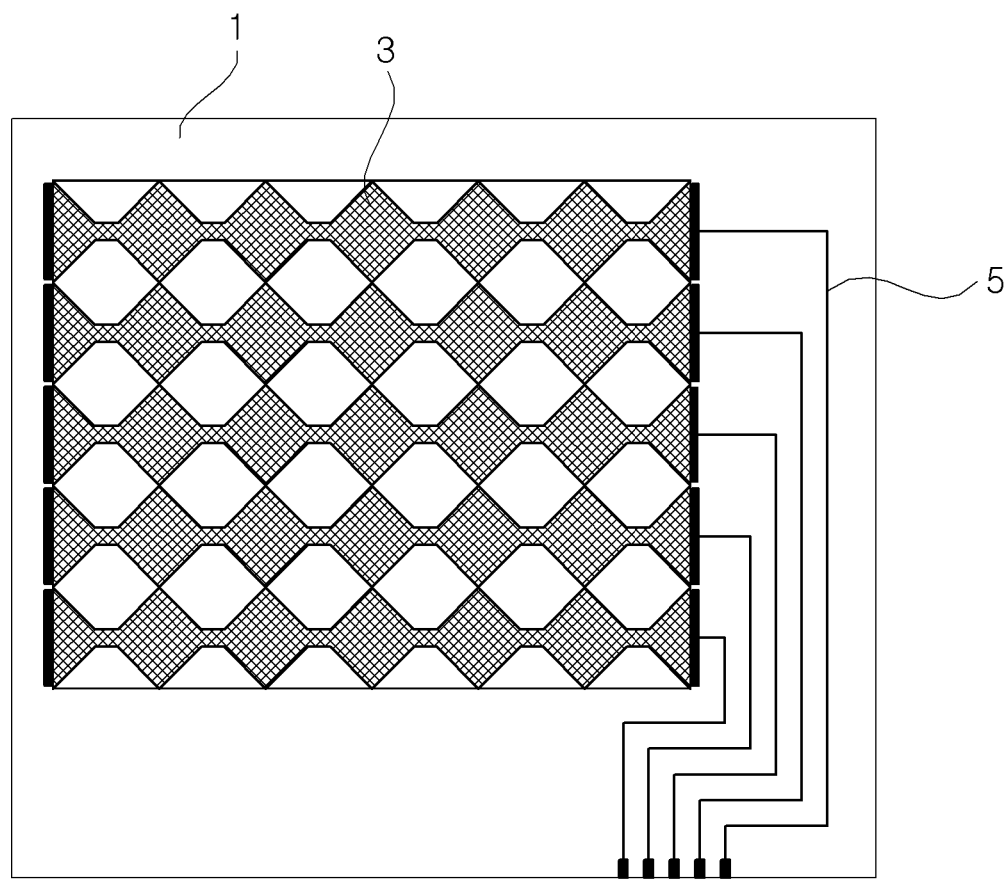

[FIG. 2A]
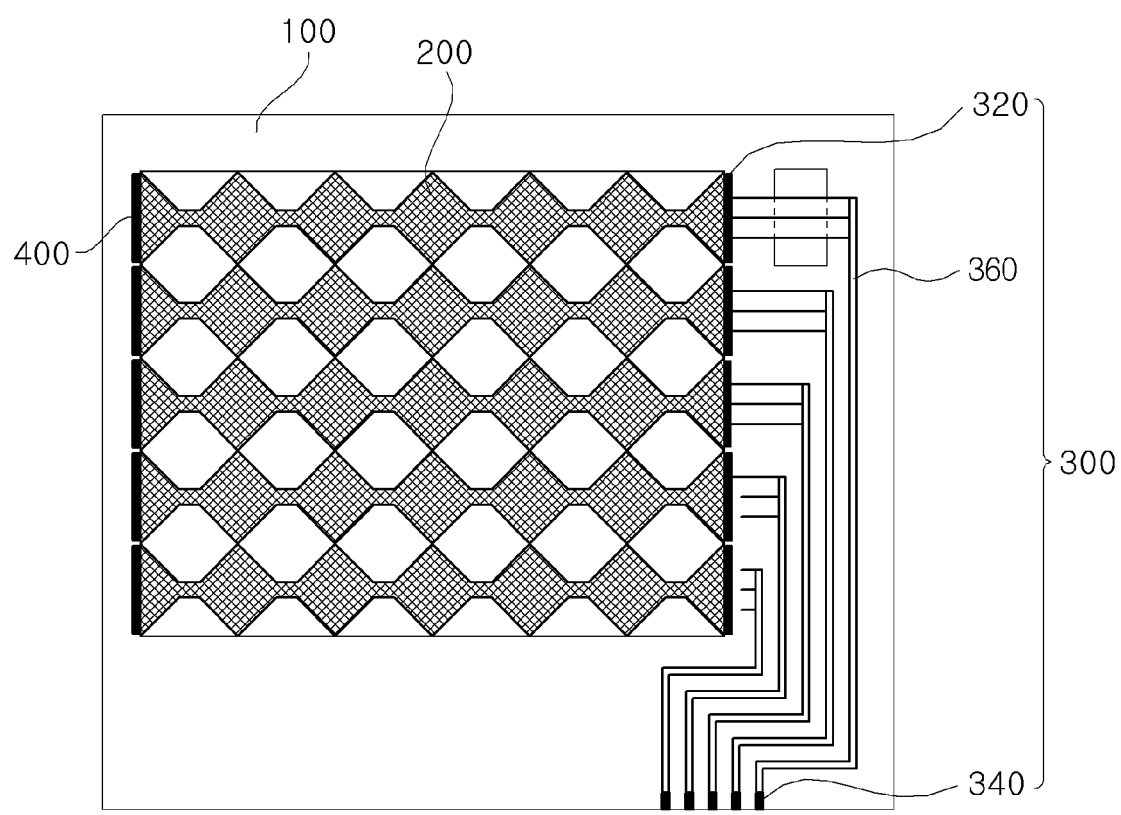

[FIG. 2B]
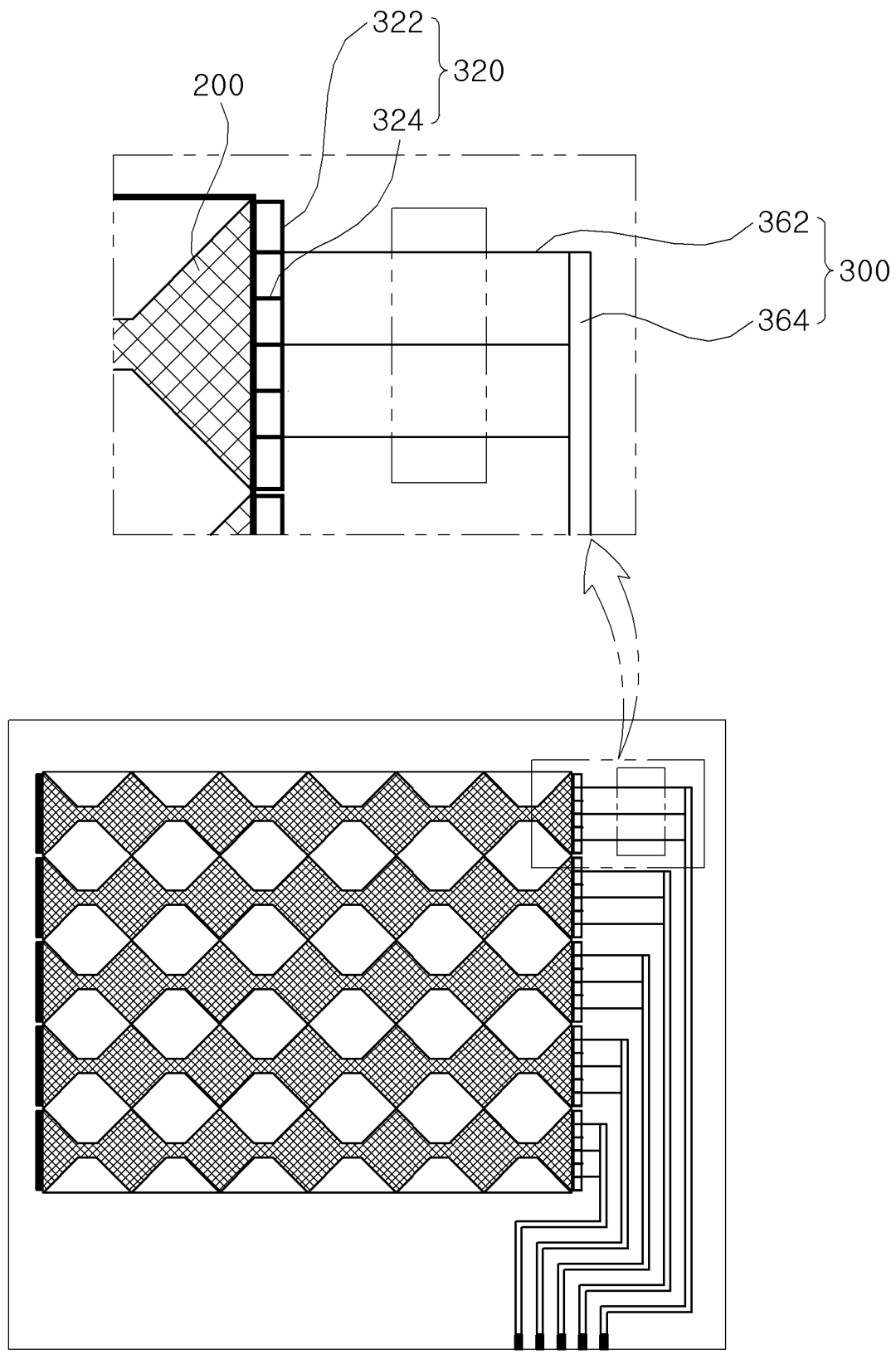

[FIG. 3A]
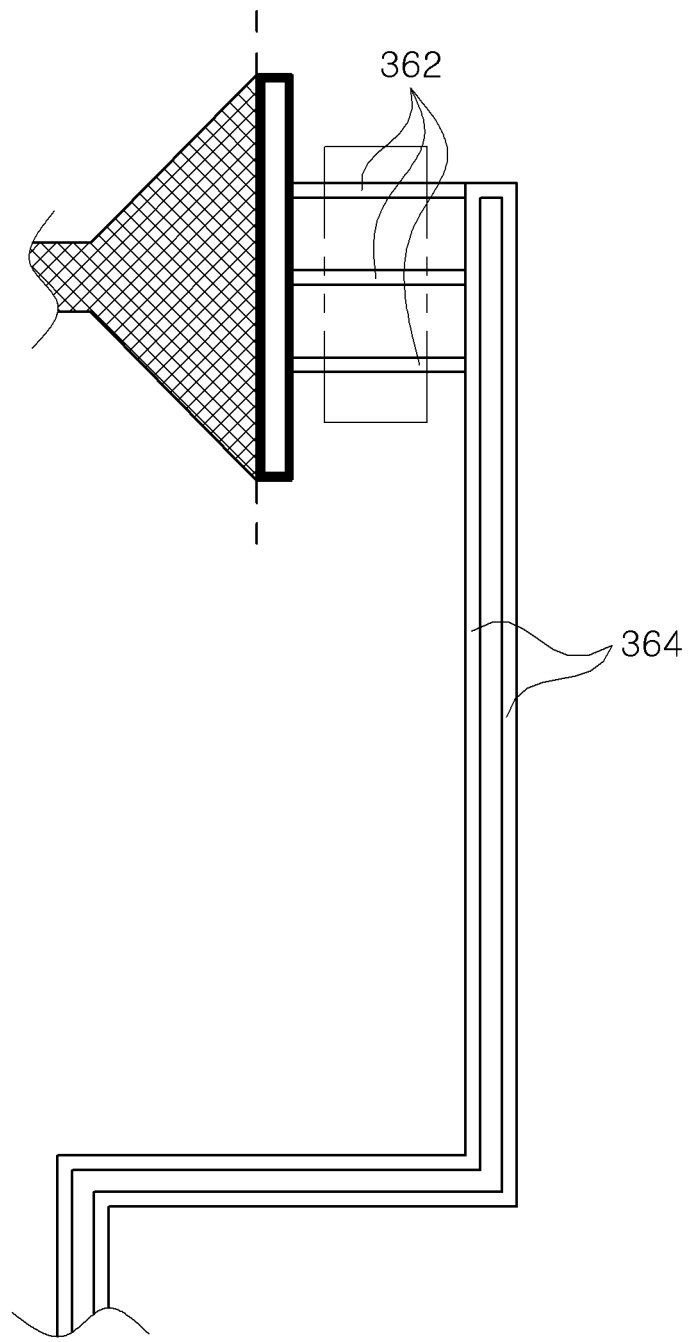

[FIG. 3B]
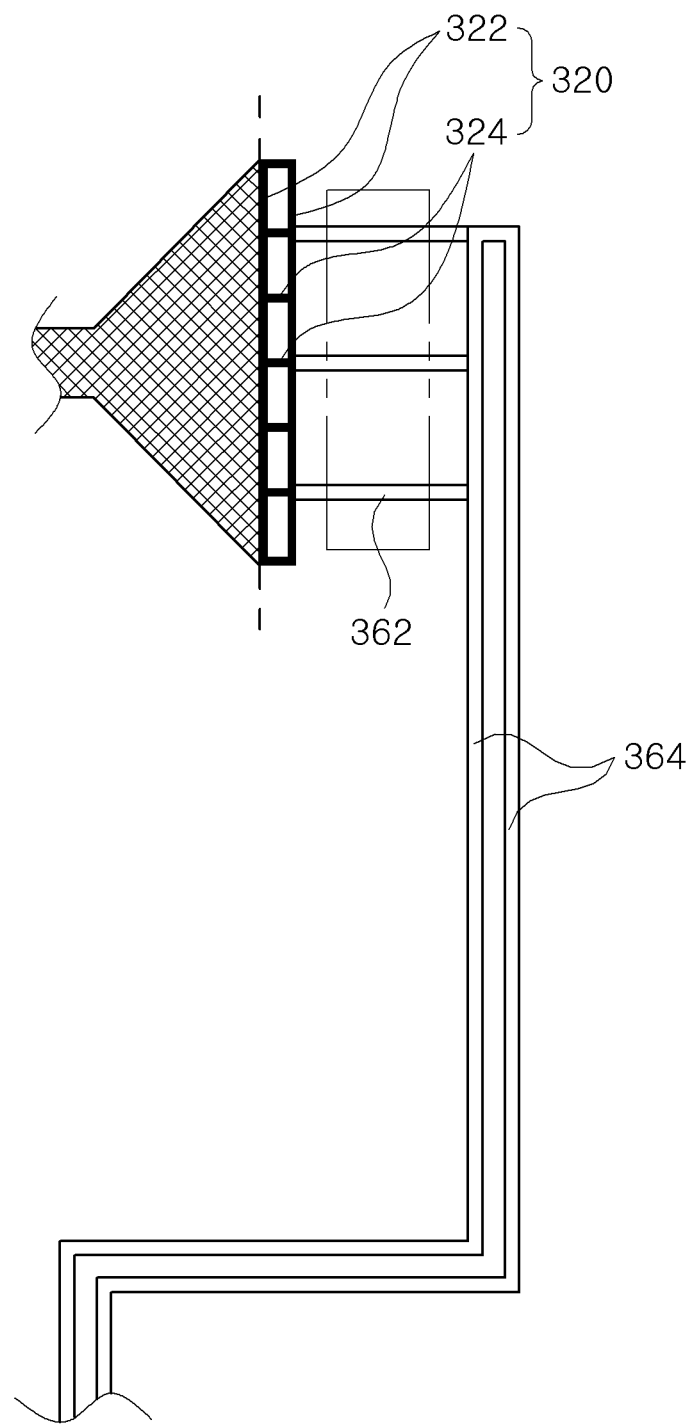

[FIG. 4A]
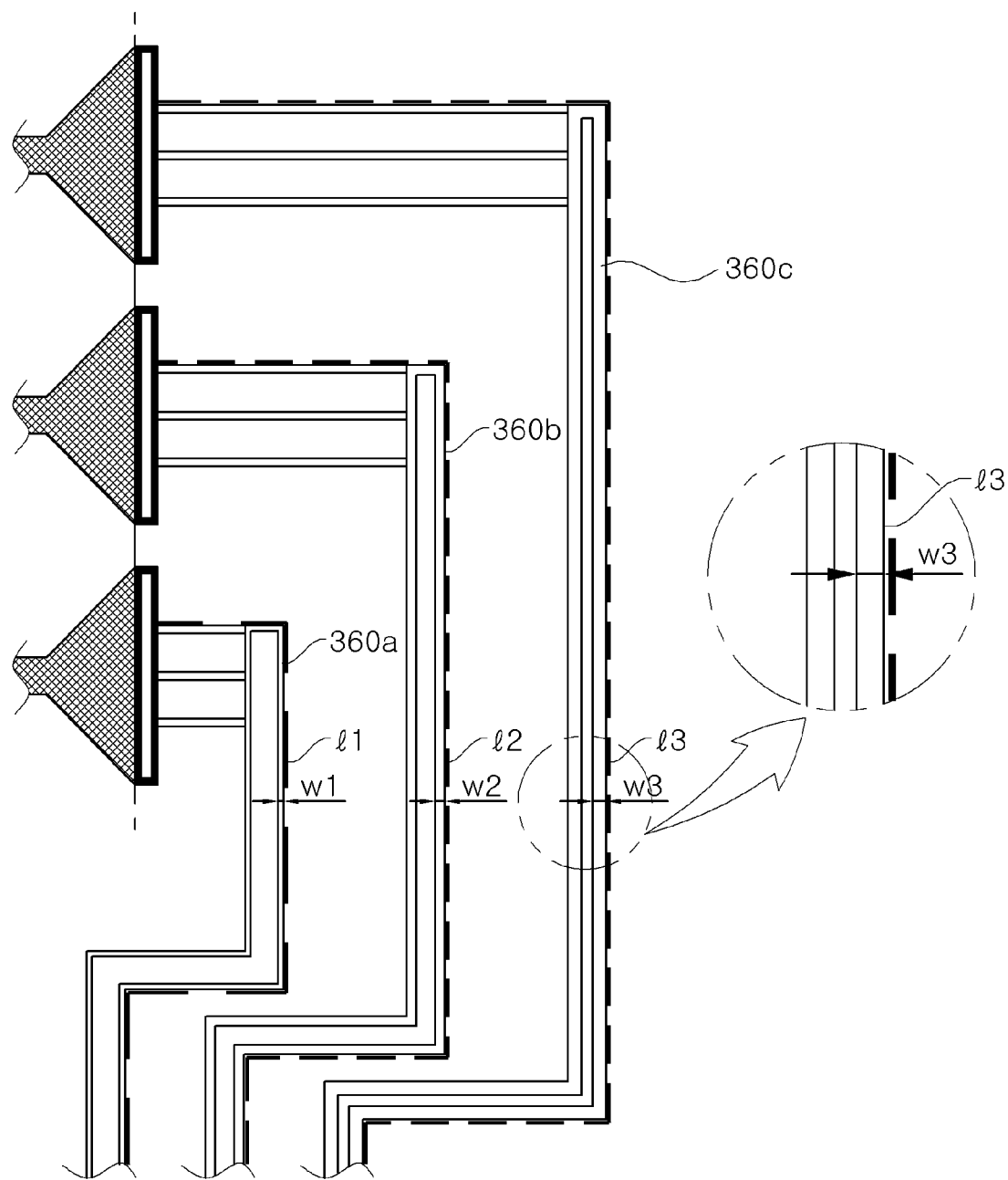

[FIG. 4B]
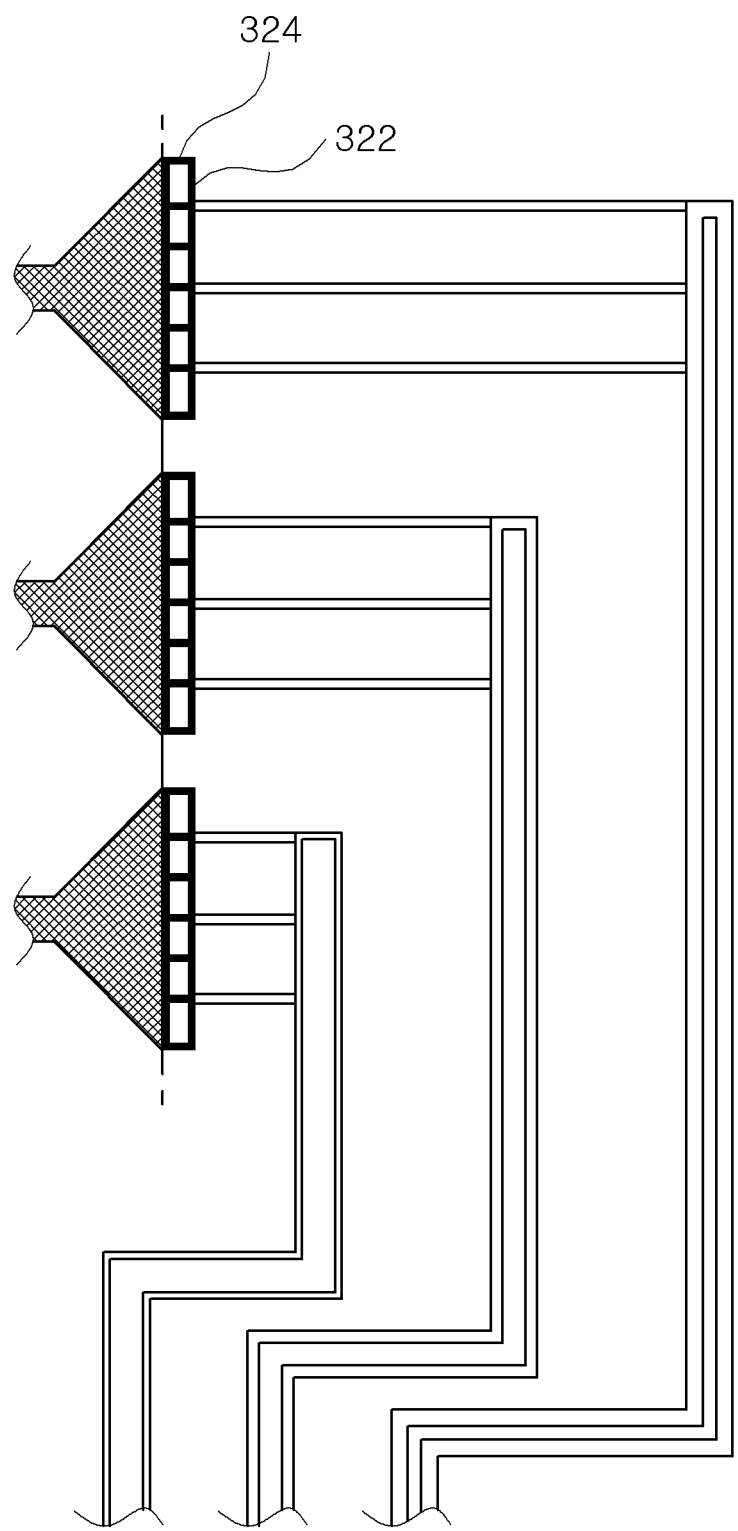

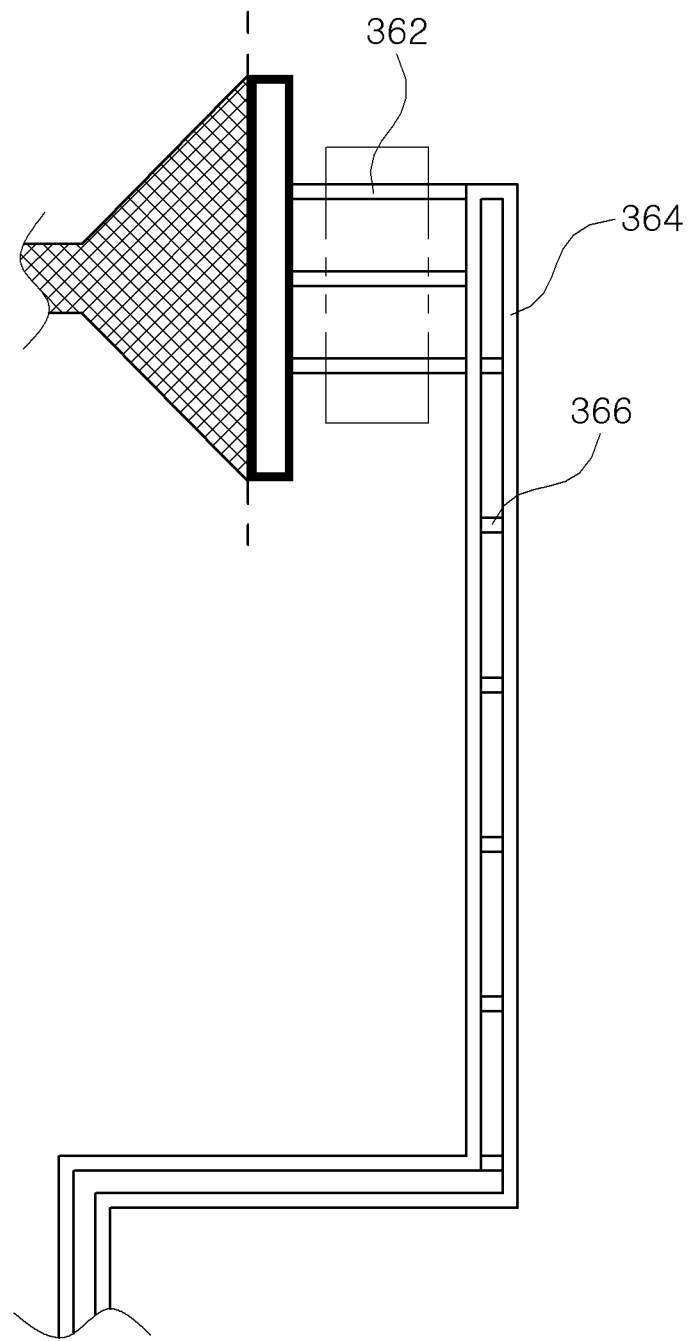
[FIG. 5A]

[FIG. 5B]
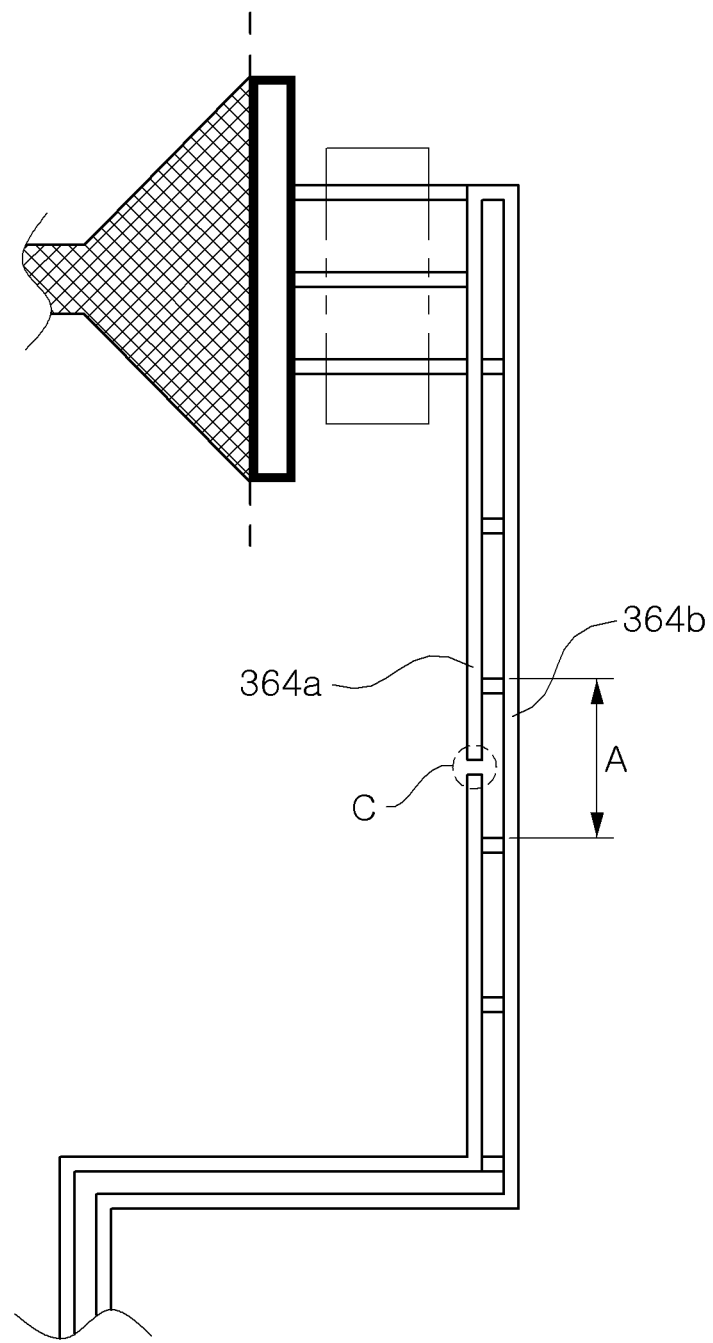

[FIG. 5C]
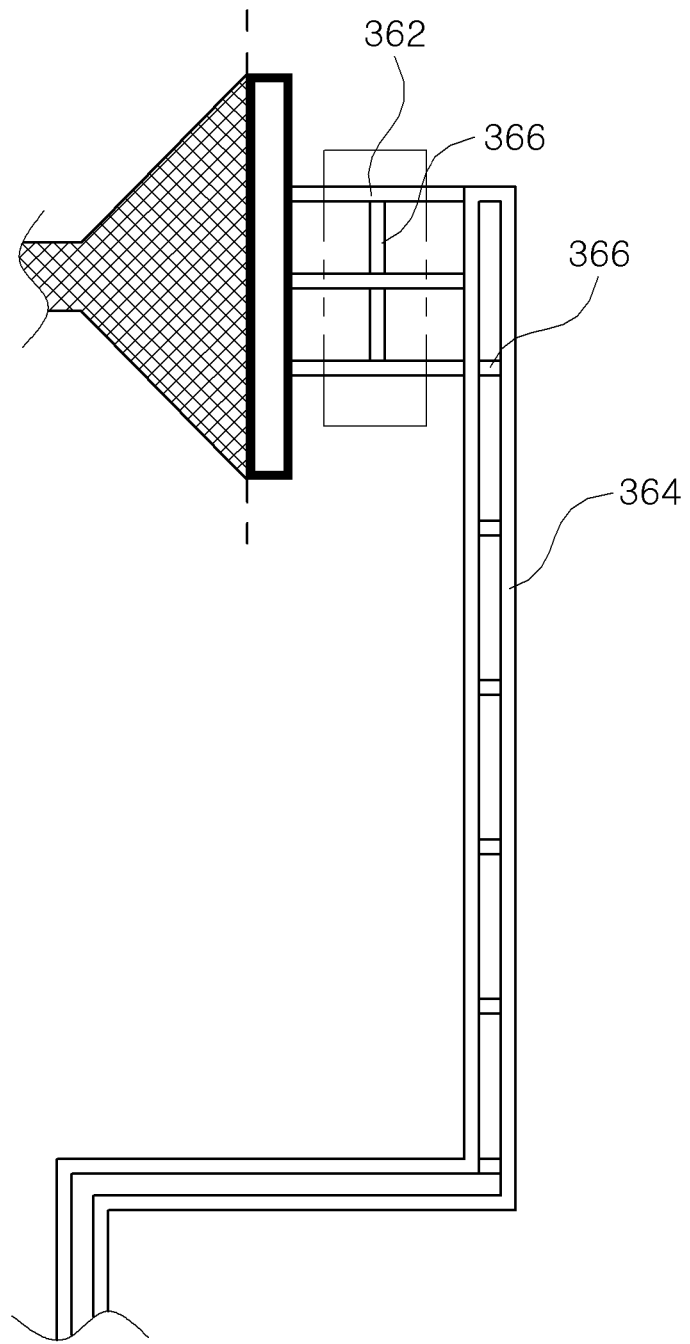

[FIG. 6A]
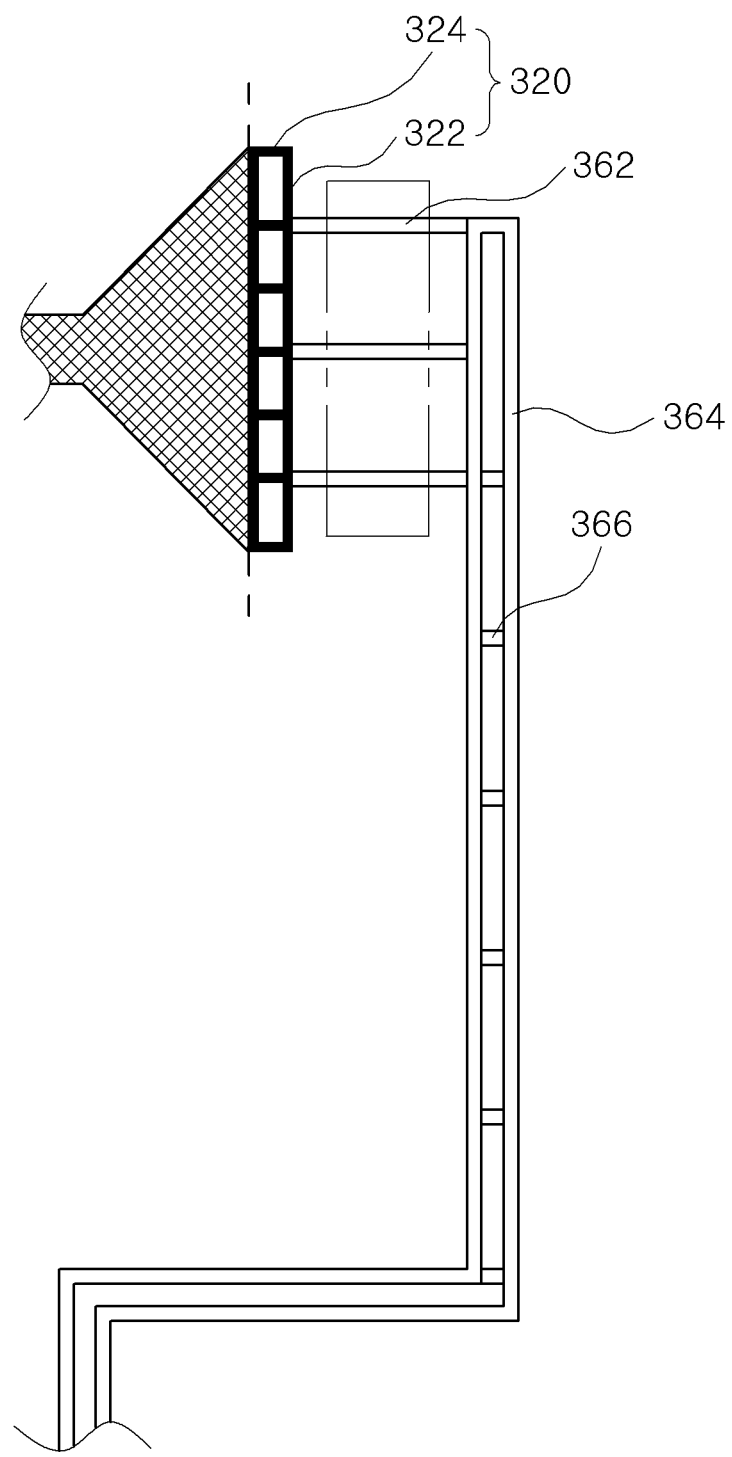

[FIG. 6B]
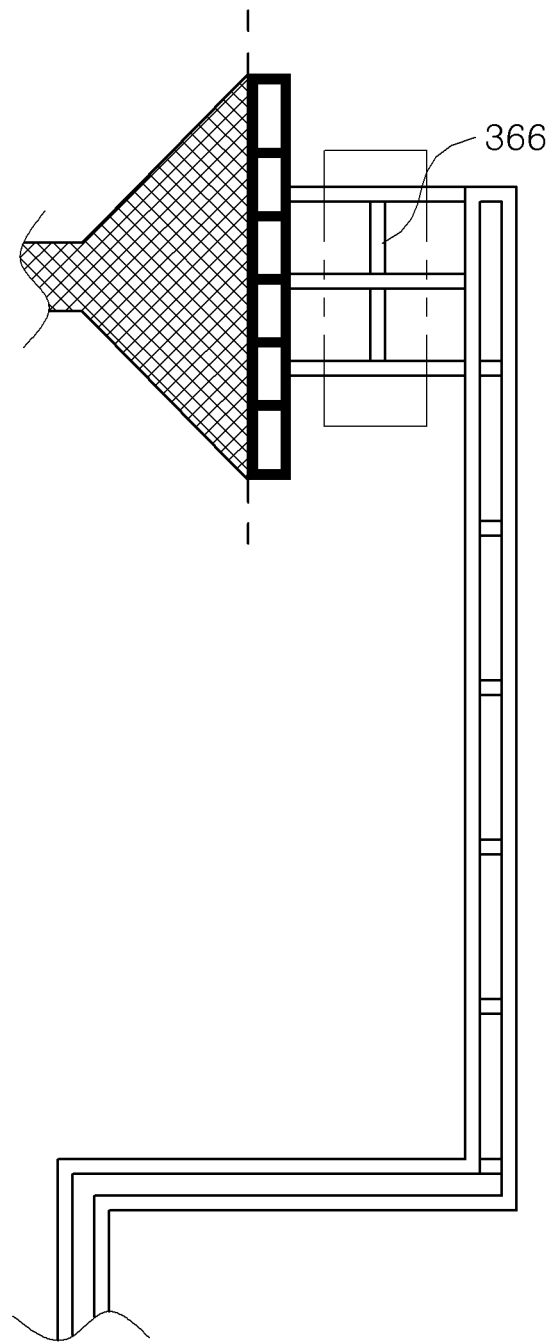

[FIG. 7]
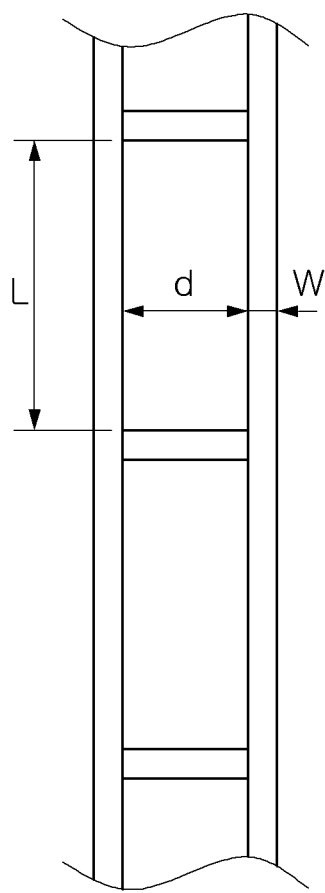

[FIG. 8]
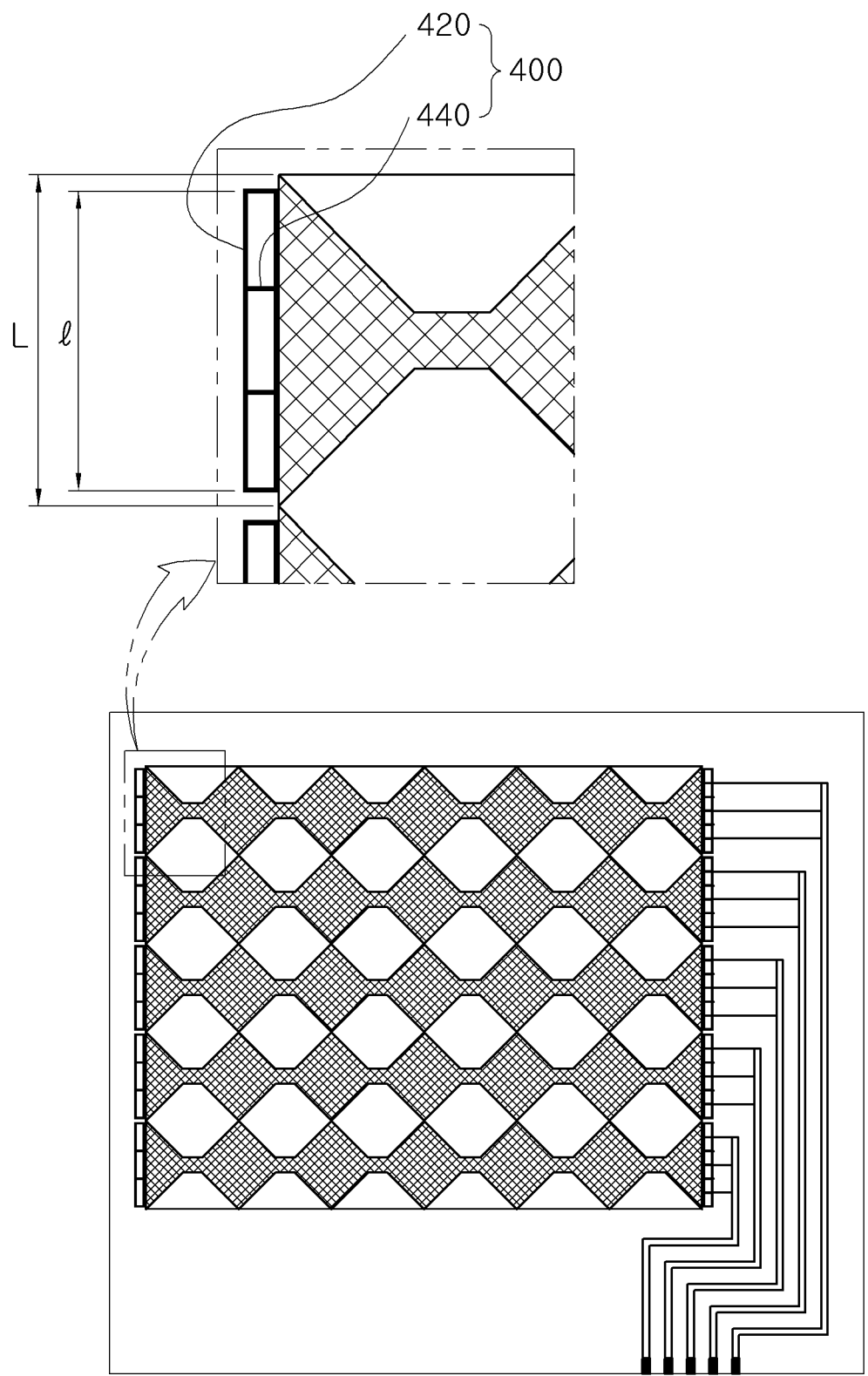

[FIG. 9A]
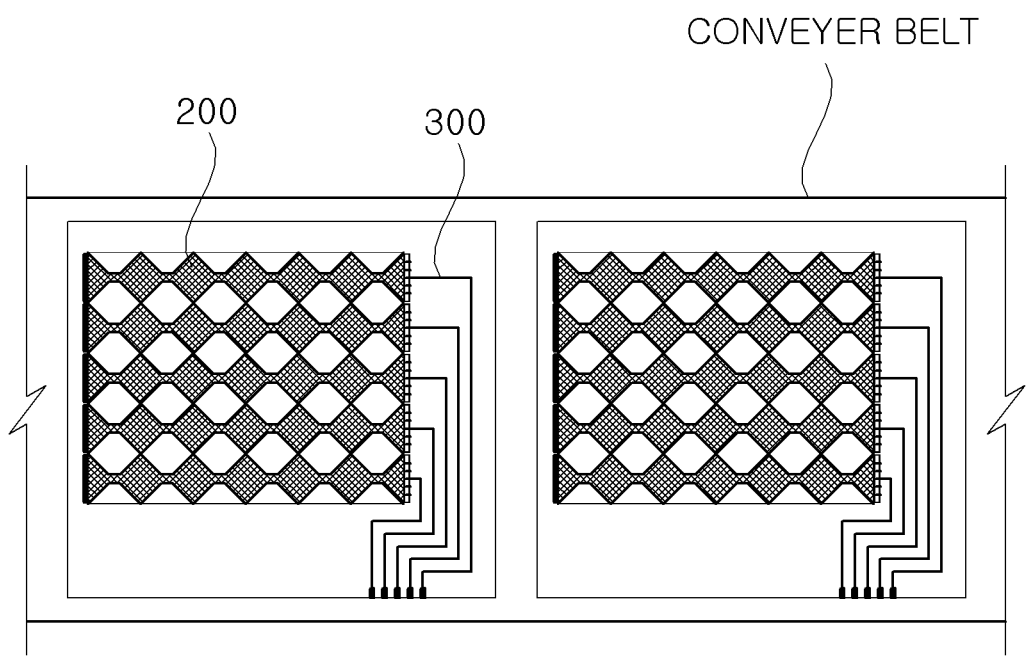

[FIG. 9B]
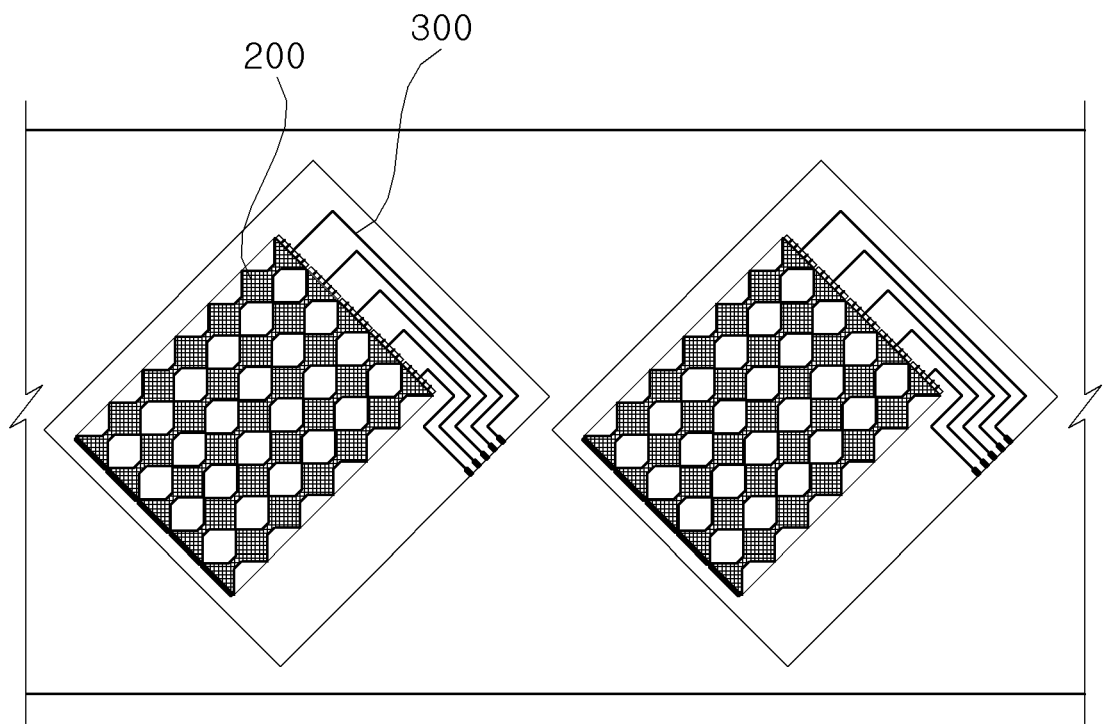

[FIG. 10]
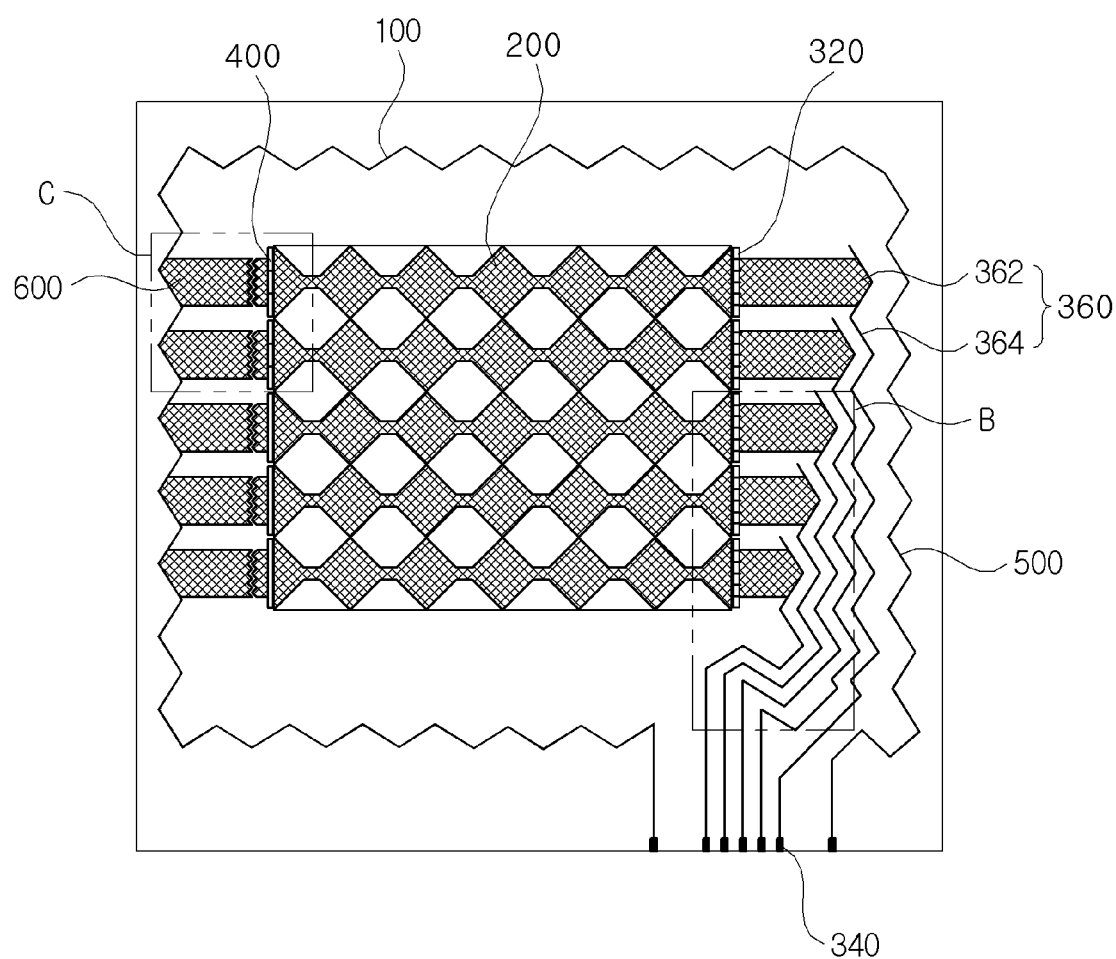

[FIG. 11]
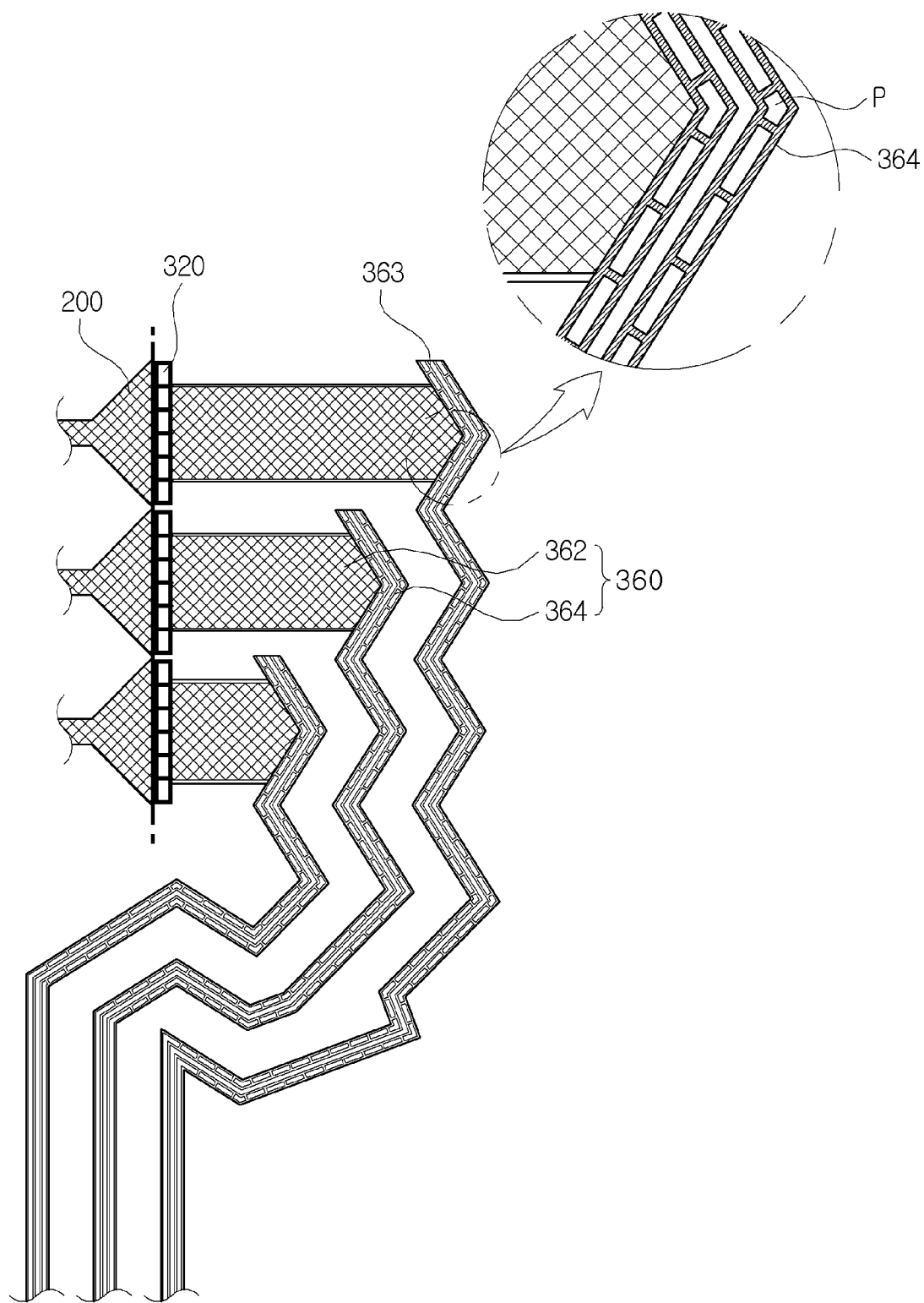

[FIG. 12]
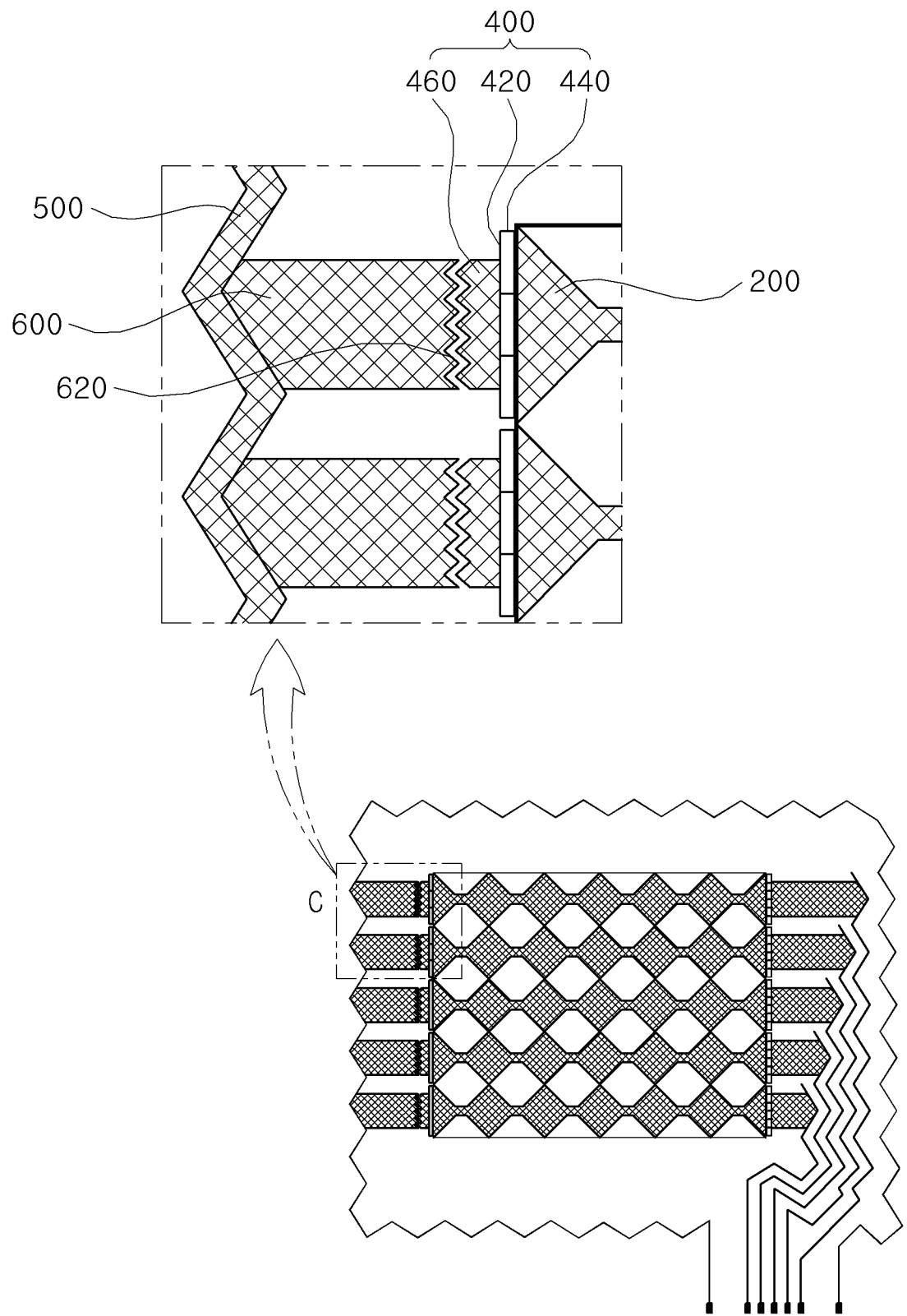

[FIG. 13A]
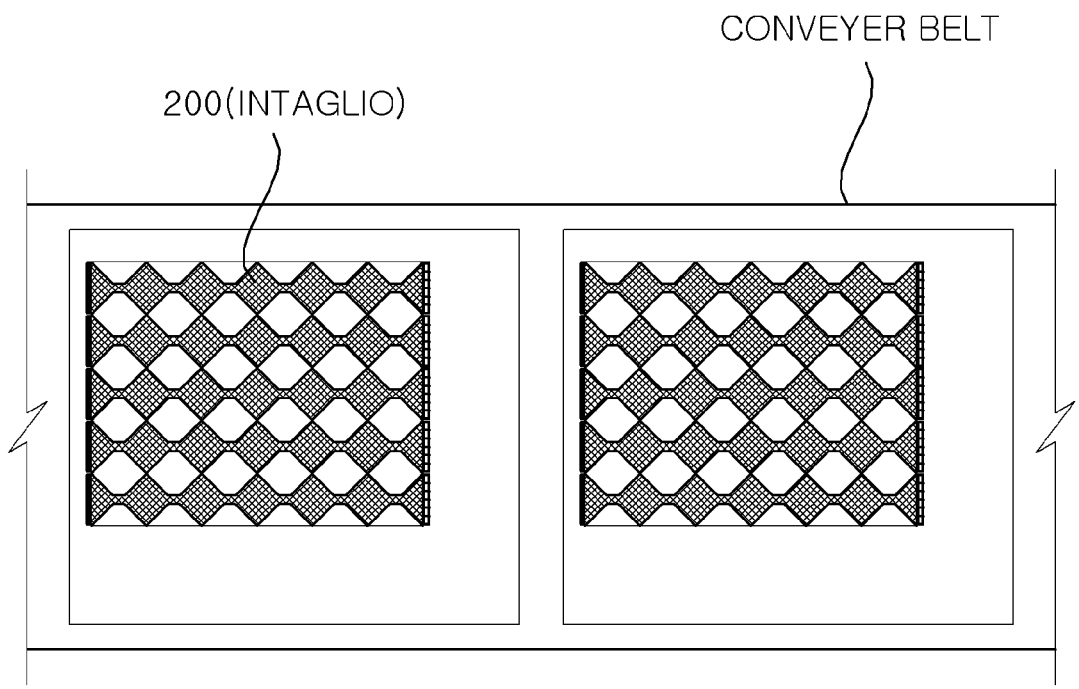

[FIG. 13B]
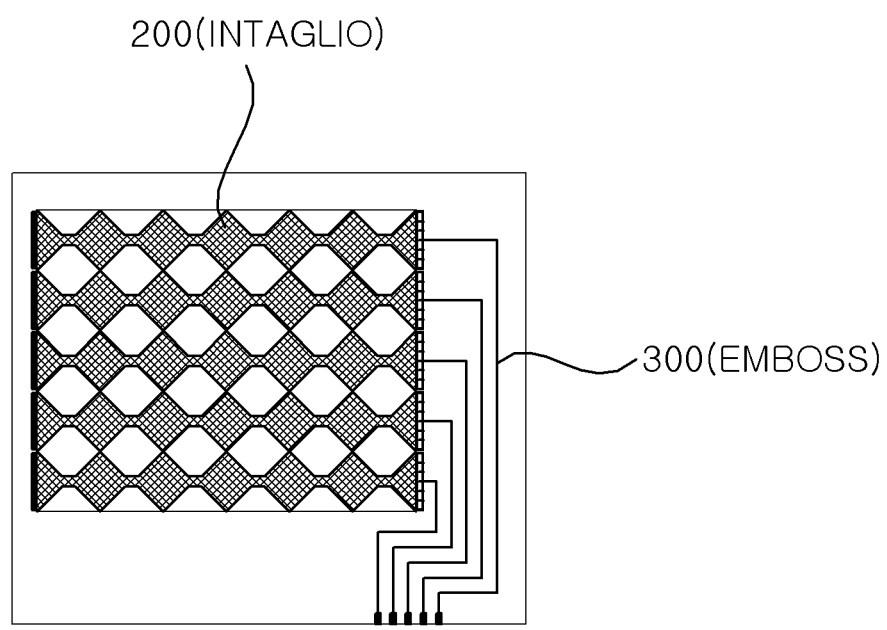

ional Stage of International Patent Application No. PCT/
WIRED ELECTRODE FOR TOUCHSCREEN PANEL, TOUCHSCREEN PANEL USING THE SAME AND MANUFACTURING METHOD OF THE SAME

CROSS-REFERENCE TO RELATED APPLICATIONS

This application is a continuation of U.S. patent application Ser. No. 14/914,820 filed Feb. 26, 2016, which is a U.S. National Stage of International Patent Application No. PCT/KR2014/007242 filed Aug. 5, 2014, which claims priority to and the benefit of Korean Patent Application No. 10-2013-0103489 filed in the Korean Intellectual Property Office on Aug. 29, 2013 and Korean Patent Application No. 10-2014-0067614 filed in the Korean Intellectual Property Office on Jun. 3, 2014, the entire contents of which are incorporated herein by reference.

TECHNICAL FIELD

The present invention relates to a wired electrode that transmits a user's touch signal detected in a signal detection pattern of a touch screen panel to an external driving circuit, a touch screen panel using the same, and a manufacturing method of the same, and more particularly, to a wired electrode that can reduce a resistance generated in a signal line and reduce occurrence of disconnection, and a touch screen panel and a manufacturing method of the same.

BACKGROUND ART

In general, a touch screen panel is an input apparatus that can input a user's command by selecting an instruction shown on a screen such as an image display device by a person's hand or an object. To this end, the touch screen panel is provided on a front face of the image display device to convert a contact position directly contacting the person's hand or the object into an electric signal. As a result, the instruction selected at the contact position is received as an input signal.

Since such a touch screen panel is connected to the image display device such as a keyboard and a mouse to replace a separate operating input device, the use range has gradually extended.

A type of implementing the touch screen panel is divided into a resistive type, a capacitive type, an electromagnetic type, and the like. Among them, two most commonly used types are the resistive type and the capacitive type.

The resistive type is a type in which two substrates coated with electrodes are constituted, and when pressure is applied by a finger or a pen, the substrates are attached to each other at the portion where the pressure is applied to recognize the position. However, the use of the resistive type has gradually decreased due to inconvenience of the operation and inaccuracy of the position recognition.

The capacitive type uses a principle for detecting static electricity generated in the human body by detecting a change in capacitance which is formed by a signal detection pattern together with another peripheral signal detection pattern or a ground electrode when the person's hand or the object is contacted to thereby convert a contact position into an electric signal. The capacitive type touch screen panel has advantages of excellent durability, good permeability, and a rapid reaction time to make up the main part of the touch screen panel these days.

In the capacitive type touch screen panel, the signal detection patterns for detecting the contact position of the user's finger occupy most of the screen, and a wired electrode for transferring a touch signal by the signal detection pattern to an external driving circuit for driving an electronic device in which the touch screen panel is installed is positioned at an edge of the screen.

FIG. 1 is a structural diagram for describing a connection structure of a wired electrode of a touch screen panel in the related art.

As illustrated in FIG. 1, in the touch screen panel in the related art, an electrode pattern 3 for detecting the user's touch signal is provided at the center of a substrate 1, and a wired electrode 5 that transmits the touch signal detected in the electrode pattern 3 to an external driving circuit (not illustrated) is included. Such a wired electrode 5 is formed so that the transmission of the electric signal is possible by forming an intaglio area on a base and filling a conductive material in the intaglio area. However, the wired electrode provided in the touch screen panel in the related art has the following problems.

There is a problem in that a difference in resistance varies according to lengths of the wired electrodes due to the limitation of a processing condition such as adhesion, filling, or printing. In the case where short-circuit or disconnection occurs in some sections of the wired electrodes, there is a problem in that the transmission of the electric signal is impossible. The disconnection mainly occurs due to the loss of the conductive material due to static electricity during the use of the touch screen panel or non-filling of the conductive material in the intaglio area when the touch screen panel is manufactured.

SUMMARY OF THE INVENTION

The present invention has been made in an effort to provide a wired electrode for a touch screen panel in which a wired electrode for transferring a signal detected in a detection pattern to a detection sensor is formed by a plurality of signal lines so that the line widths thereof are controlled according to lengths of the plurality of formed signal lines.

The present invention has also been made in an effort to provide a wired electrode for a touch screen panel in which a wired electrode for transferring a signal detected in a detection pattern to a detection sensor is formed by a plurality of signal lines so that the plurality of formed signal lines is connected to each other at predetermined intervals.

The present invention has also been made in an effort to provide a touch screen panel and a manufacturing method thereof that can effectively prevent the disconnection of the wired electrode.

An exemplary embodiment of the present invention provides a wired electrode for a touch screen panel including: a contact unit electrically connected to one end of an electrode pattern generating a touch signal; a bonding unit configured to transmit the touch signal detected in the electrode pattern by contacting an external driving circuit; and a signal line unit configured by a plurality of first signal lines connected to the contact unit and a plurality of second signal lines connected between the plurality of first signal lines and the bonding unit to connect the contact unit and the bonding unit.

Another exemplary embodiment of the present invention provides a touch screen panel including: a substrate; a plurality of electrode patterns formed on the substrate to generate a touch signal; and a plurality of wired electrodes according to the present invention connected to the plurality of electrode patterns, respectively.

Yet another exemplary embodiment of the present invention provides a manufacturing method of a touch screen panel including: forming a plurality of electrode patterns by filling a conductive material in an intaglio pattern formed on a substrate; and forming a wired electrode connected to each of the plurality of electrode patterns on the substrate.

According to the exemplary embodiment of the present invention, the wired electrode for transferring a signal detected in a detection pattern to a detection sensor is formed by a plurality of signal lines so that line widths are controlled according to lengths of the plurality of formed signal lines or the plurality of signal lines is connected to each other at predetermined intervals, and as a result, it is possible to reduce the resistance generated in the signal line.

It is also possible to decrease deviation in a resistance occurring according to the length of each channel by controlling the line width according to the length of the plurality of signal lines.

Since the plurality of signal lines is formed to be connected to each other at predetermined intervals, it is also possible to minimize the occurrence of disconnection even though one signal line is short-circuited.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a connection structural diagram of a wired electrode of a touch screen panel in the related art.

FIGS. 2A and 2B are structural diagrams of a touch screen panel including a wired electrode for a touch screen panel according to the present invention.

FIGS. 3A to 6B illustrate first exemplary embodiments of a wired electrode for a touch screen panel according to the present invention.

FIG. 7 illustrates a bridge of the present invention.

FIG. 8 illustrates a resistance measuring terminal of the present invention.

FIGS. 9A and 9B illustrate a step of filling a conductive material in a manufacturing process of a touch screen panel.

FIG. 10 illustrates a second exemplary embodiment of the wired electrode for the touch screen panel according to the present invention.

FIGS. 11 and 12 are partially enlarged diagrams of FIG. 10.

FIGS. 13A and 13B are schematic diagrams of another manufacturing method of a touch screen panel according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a wired electrode for a touch screen panel and a touch screen panel according to exemplary embodiments of the present invention will be described in more detail with reference to the accompanying drawings.

When describing constituent elements of the present invention, the constituent elements having the same name may designate different reference numerals according to the drawings, and may designate like reference numerals even in different drawings. However, even in this case, the corresponding constituent elements have different functions according to an exemplary embodiment or do not have the same function in different exemplary embodiments, and the function of each constituent element should be determined based on the description for each constituent element in the corresponding exemplary embodiment.

The present invention proposes a structure of a wired electrode for a touch screen panel in which a wired electrode for transferring a signal detected in a detection pattern to a detection sensor is formed by a plurality of signal lines so that line widths thereof are controlled according to lengths of the plurality of formed signal lines or the plurality of signal lines is connected to each other at predetermined intervals.

The present invention also proposes a structure of a wired electrode for a touch screen panel that can effectively prevent disconnection of an electrode pattern and a wired electrode.

FIGS. 2A and 2B are structural diagrams illustrating the overall configuration of a touch screen panel including a wired electrode for a touch screen panel according to the present invention.

As illustrated in FIGS. 2A and 2B, the touch screen panel according to the present invention includes a base or substrate 100, an electrode pattern 200, and a wired electrode 300, and may further include a resistance measuring terminal 400.

The substrate 100, as one area of the base on which the electrode pattern 200 and the wired electrode 200 are formed, may be used without limitation of a material, such as a transparent film, a glass substrate, a plastic substrate, and the like. Particularly, the substrate 100 may be formed as the transparent film, and the transparent film may formed by using at least one of polyethylene terephthalate (PET), polyimide (PI), acryl, polyethylene naphthalate (PEN), or glass.

The electrode pattern 200 is a constituent element which is provided on the substrate 100 to detect a touch signal of the user.

The wired electrode 300, as a constituent element of transferring the touch signal detected from the electrode pattern 200 to a detection sensor (not illustrated) of the external driving circuit, is connected to the electrode pattern 200 formed on the substrate 100.

The wired electrode 300 is configured to include a contact unit 320 electrically connected with the electrode pattern 200, a bonding unit 340 transmitting a touch signal detected in the electrode pattern 200 by contacting the external driving circuit (not illustrated), and a signal line unit 360 connecting the contact unit 320 and the bonding unit 340.

The contact unit 320, a pad contacting one end of the electrode pattern 200, is electrically connected with the electrode pattern 200 and may be made of a conductive material that is capable of transmitting the electric signal.

The bonding unit 340 may be formed on an end of the substrate 100 in order to transfer the electric signal to the external driving circuit. The line width of the bonding unit 340 may be formed to be larger than the line width of the signal line unit 360. The line width of the bonding unit 340 is larger than the line width of the signal line unit 360 so that the external driving circuit may be stably connected to the bonding unit 40. That is, a conductive connection line corresponding to the bonding unit 340 is formed in the external driving circuit, and in the case where the conductive connection line and the bonding unit 340 have a slightly large line width as compared to the case of having the minute line width like the signal line unit 360, more stable electric connection is possible.

The signal line unit 360 is made of the conductive material so that the electric signal can be transmitted between the contact unit 320 and the bonding unit 340 through a line connecting the contact unit 320 and the bonding unit 340.

Referring to FIGS. 2A and 2B, the signal line unit 360 may be divided into a first signal line 362 connected to the contact unit 320 and a second signal line 364 connected between the first signal line 362 and the bonding unit 340. The first signal line 362 is connected to the contact unit 320 to transfer the electric signal to the vicinity of the edge of the touch screen panel, and the second signal line 364 is connected to the first signal line 362 to transfer the electric signal to the bonding unit 340 along the edge of the touch screen panel. As such, the reason why the signal line unit 360 is entirely disposed at the edge of the touch screen panel is that in the case of an electronic device including the touch screen panel, a part of a case called a bezel generally covers the edge of the touch screen panel and then the signal line unit 360 is positioned below the bezel to ensure a touch screen as large as possible.

In the signal line unit 360, a plurality of signal lines may be spaced apart from each other at predetermined intervals to be formed in parallel. For example, in the signal line unit 360, three first signal lines 362 are formed in parallel, and two second signal lines 364 may be connected to the first signal lines 362 in parallel.

Here, the number of first signal lines and the number of second signal lines are different from each other, but are not necessarily limited thereto and may be variously formed if necessary.

In the contact unit 320, a plurality of contact lines 322 are spaced apart from each other at predetermined intervals to be formed in parallel to be parallel to a contact surface of the electrode pattern 200. A bridge 324 connected between the contact lines 322 at each predetermined interval may be formed.

The contact lines 322 constituting the contact unit 320 may be formed to be vertical to the first signal line 362.

In this case, the first signal line 362 is formed to be connected to the bridge 324 formed in the contact unit 320, and the first signal line 362 and the bridge 324 of the contact unit 320 may be positioned on the same line, that is, formed in a shape such as one line. When the bridge 324 and the first signal line 362 are positioned on the same line, electric resistance is reduced, and as a result, a flow of the signal detected from the electrode pattern 200 becomes smoother than a flow when the bridge 324 and the first signal line 362 are positioned on different lines.

The number of bridges 324 may be the same as the number of first signal lines 362, but is not necessarily limited thereto and may be smaller or larger than the number of first signal lines 362 if necessary.

The resistance measuring terminal 400 is formed at the end to which the wired electrode 300 of the electrode pattern 200 is not connected, and used for the detection of whether the electrode is disconnected or the resistance is increased. In detail, while an AC signal is applied to the bonding unit 340, it may be determined whether the electrode pattern 200 connected to the bonding unit 340 or the signal line unit 360 is disconnected and short-circuited by using a voltage measured in the resistance measuring terminal 400. If the voltage measured in the resistance measuring terminal 400 is lower than a predetermined normal value, it may be determined that the electrode pattern 200 is short-circuited, and if the measured voltage is higher than the normal value, it may be determined that a short-circuit between the electrode patterns 200 occurs.

FIGS. 3A and 3B illustrate a first exemplary embodiment of a wired electrode for a touch screen panel according to the present invention.

As illustrated in FIGS. 3A and 3B, a plurality of first and second signal lines 362 and 364 of the wired electrode 300 are spaced apart from each other at predetermined intervals to be connected to each other in parallel.

For example, as illustrated in FIG. 3A, three first signal lines 362 connected to the contact unit 320 are spaced apart from each other at predetermined intervals to be formed in parallel, and two second signal lines 362 connected to the bonding unit 340 may be spaced apart from each other at a predetermined interval to be formed in parallel.

FIG. 3B illustrates a structure in which the plurality of first and second signal lines 362 and 364 are spaced apart from each other at predetermined intervals to be connected to the contact unit 320 in parallel, in which the plurality of contact lines 322 are spaced apart from each other at predetermined intervals in parallel to be parallel to the contact surface of the electrode pattern 200 and the bridge 324 connected between the contact lines 322 at each predetermined distance is formed.

In this case, a line width w of each of the plurality of first and second signal lines 362 and 364 may be formed to 100 μm or less, and a separation distance d between the first and second signal lines may be as the following Equation 1.

$$d \geq w \times 0.5 \qquad \text{[Equation 1]}$$

FIGS. 4A and 4B illustrate modified embodiments of the first exemplary embodiment of the wired electrode for the touch screen panel according to the present invention.

As illustrated in FIGS. 4A and 4B, in the wired electrode 300, the plurality of first and second signal lines 362 and 364 are spaced apart from each other at predetermined intervals to be connected to each other in parallel, and since the resistance varies according to the length of the first and second signal lines 362 and 364, a line width of each of the first and second signal lines 362 and 364 may be relatively controlled. This is the same as a case where line widths of signal line units 360 having different lengths are relatively controlled.

For example, as illustrated in FIG. 4A, a line width of a signal line unit 360a having a shortest length may be formed to be smallest, a line width of a signal line unit 360b having a second shortest length may be formed to be second smallest, and a line width of a signal line unit 360c having a third shortest length may be formed to be third smallest.

In other words, the line width of the signal line unit 360a having a length of l1 is w1, the line width of the signal line unit 360b having a length of l2 is w2, the line width of the signal line unit 360c having a length of l3 is w3, and when a relative relationship of the lengths is l1<l2<l3, the relative relationship of the line widths is w1<w2<w3.

That is, as the length of the signal line unit 360 is decreased, the line width of the signal line unit 360 is formed to be smaller, and as the length of the signal line unit 360 is increased, the line width of the signal line unit 360 is formed to be larger, and as a result, the resistance deviation between the signal line units 360 may be decreased.

Here, an example in which the resistance deviation between the channels is controlled by controlling the line width of each signal line unit is described, but is not limited thereto, and it is good to have any structure in which the resistance deviation between the signal line units 360 may be decreased by controlling a size of the signal line unit, a separation distance between the signal line units, the number of first and second signal lines, and the like, if necessary.

As illustrated in FIG. 4B, in the contact unit 320, the plurality of contact line 322 are spaced apart from each other at predetermined intervals to be formed in parallel, and the bridge 324 connected between the lines for each predetermined interval may be formed.

FIGS. 5A to 5C illustrate other modified embodiments of the first exemplary embodiment of the wired electrode for the touch screen panel according to the present invention.

Referring to FIG. 5A, in the wired electrode 300, the plurality of first and second signal lines 362 and 364 are spaced apart from each other at predetermined intervals to be connected to each other in parallel, and a bridge structure connecting the first and second signal lines 362 and 364 at each predetermined interval may be formed.

For example, the first signal lines 362 are spaced apart from each other at predetermined intervals to be connected to each other in parallel, the second signal lines 364 are spaced apart from each other at predetermined intervals to be connected to each other in parallel, and a bridge 366 connected between the second signal lines 364 at each predetermined interval may be formed.

On the contrary, the first signal lines 362 are spaced apart from each other at predetermined intervals to be connected to each other in parallel, a bridge 366 connected between the first signal lines 362 for each predetermined interval may be formed, and the second signal lines 364 are spaced apart from each other at predetermined intervals to be connected to each other in parallel.

Referring to FIG. 5B, in the case where the wired electrode 300 is formed in the pattern illustrated in FIG. 5A, when a short-circuit C occurs in some sections A of the second signal lines 364, the signal line 364*a* where the short-circuit occurs is not used, but the signal line 364*b* where the short-circuit does not occur may be used.

As such, in the wired electrode for the touch screen panel according to the present invention, the bridge 366 is formed in the first or second signal lines 362 and 364, and as a result, the occurrence of disconnection may be minimized.

FIG. 5C illustrates a pattern in which the first and second signal lines 362 and 364 of the wired electrode 300 are spaced apart from each other at predetermined intervals to be connected to each other in parallel, and bridges 366 connecting the first and second signal lines 362 and 364 at each predetermined interval are formed.

That is, the first signal lines 362 are spaced apart from each other at predetermined intervals to be connected to each other in parallel, the bridge 364 connected between the first signal lines 362 for each predetermined interval is formed, the second signal lines 364 are spaced apart from each other at predetermined intervals to be connected to each other in parallel, and the bridge 366 connected between the second signal lines 364 for each predetermined interval is formed.

Accordingly, in the case where the disconnection occurs in some sections of the first or second signal lines 362 or 364, the signal line where the disconnection occurs is not used, but the signal line where the disconnection does not occur may be used.

In this case, an interval of the bridges 366 formed between the first signal lines 362 and an interval of the bridges 366 formed between the second signal lines 364 may be formed to be the same as each other or different from each other.

FIGS. 6A and 6B illustrate yet other modified embodiments of the first exemplary embodiment of the wired electrode for the touch screen panel according to the present invention.

FIG. 6A illustrates a pattern where bridges 324 and 366 are formed at the contact unit 320 and the second signal line 364, respectively, and FIG. 6B illustrates a pattern where the bridges 324 and 366 are formed at the contact unit 320 and the first and second signal lines 362 and 364, respectively.

FIG. 7 illustrates a bridge of the present invention.

As illustrated in FIG. 7, an interval L between the bridges may be formed in a range of 300 μm to 500 μm, and a length of the bridge or a distance D between the lines may be formed in a range of 20 μm to 60 μm, and the line width W of the line may be formed in a range of 10 μm to 40 μm.

An implementation aspect of the bridge may be applied to the contact unit 320 or the signal line unit 360.

FIG. 8 illustrates a resist measuring terminal of the present invention.

As illustrated in FIG. 8, in the resistance measuring terminal 400, a plurality of terminal lines 420 are spaced apart from each other at predetermined intervals to be formed in parallel, and a bridge 440 connected between the terminal lines 420 for each predetermined distance may be formed.

In this case, in order to prevent an error of interference between the resistance measuring terminals 400, the size of the resistance measuring terminal 400 may be controlled. That is, the resistance measuring terminals 400 may be spaced apart from each other by a predetermined distance.

For example, a width I of the resistance measuring terminals 400 may be formed to be smaller than a width L of the contact surface of the electrode pattern 200 by a predetermined length. That is, as a difference between the width I of the resistance measuring terminal 400 and the width L of the contact surface of the electrode pattern 200 is increased, the interval between the resistance measuring terminals is increased.

In this case, the difference L-I between the width I of the resistance measuring terminal 400 and the width L of the contact surface of the electrode pattern 200 may be equally formed, and for example, may be formed in a range of 50 μm to 150 μm. Two ends of the width of the resistance measuring terminal 400 are spaced apart from two ends of the width of the contact surface of the electrode pattern 200 at the same distance, and the resistance measuring terminals 400 and the electrode pattern 200 are arranged in a central axis.

Next, a structure of a wired electrode for a touch screen panel that may effectively prevent the disconnection of the wired electrode in addition to an increase in manufacturing efficiency of the touch screen panel will be described.

The disconnection of the wired electrode mainly occurs due to static electricity when the touch screen panel is used or manufactured, or discontinuous filing in which a conductive material is not filled well in an intaglio formed in the base when the touch screen panel is manufactured.

To be understood, first, after a manufacturing method of the touch screen panel is described, a wired electrode for the touch screen panel according to the present invention that can promote both improvement of manufacturing efficiency and prevention of the disconnection of the wired electrode will be described.

FIGS. 9A and 9B illustrate a step of filling a conductive material in a manufacturing process of a touch screen panel. In general, as illustrated in FIGS. 9A and 9B, an electrode pattern 200, a wired electrode 300, a ground electrode (not illustrated), and the like are formed by filling a conductive material in an intaglio pattern by using a roller, a doctor blade, and the like while a base with the intaglio pattern moves. However, in the case where the intaglio pattern is vertical or horizontal to a carrying direction of the base, the conductive material is not filled well, and as a result, the disconnection frequently occurs. After the conductive material is filled, even when cleaning is performed, in the case where the intaglio pattern is vertical or horizontal to the carrying direction of the base, the conductive material in the intaglio pattern is wiped together, and as a result, there is a problem in that the filling property is lowered. Accordingly, a method of arranging an intaglio pattern grid of the electrode pattern 200 in an oblique direction to a progress direction of the base as illustrated in FIG. 9A is adopted in the related art so that the intaglio pattern may form a predetermined acute angle with the progress direction of the base.

However, in the case of the displacement illustrated in FIG. 9A, the filling of the conductive material is good in the electrode pattern 200, but since most of the conductive material is disposed in a bezel area, the wired electrode 300 disposed in parallel to the outside of the base is still disposed in a vertical or horizontal direction to the carrying direction of the base, and as a result, there is a problem in that the filling of the conductive material in the wired electrode 300 is bad or the conductive material is wiped during cleaning and thus the disconnection occurs. To solve the problem, FIG. 9 illustrates a case where the base is disposed in the oblique direction to the carrying direction of the base, and since the substrate 100 is arranged in a diagonal direction, the displacement density of the substrate 100 is lowered, and as a result, there are problems in that production efficiency per unit time deteriorates and the displacement and the operation of a conductive material filling means such as a roller and a doctor blade are complicated.

The wired electrode for the touch screen panel according to the present invention improves non-efficiency on the process and effectively prevents the disconnection of the conductive material, and FIG. 10 illustrates a touch screen panel including a second exemplary embodiment of the wired electrode for the touch screen panel according to the present invention.

The wired electrode for the touch screen panel according to the present invention, as a wired electrode which is provided on the touch screen panel including the substrate 100 and the electrode pattern 200 to transfer the electric signal detected in the electrode pattern 200 to an external driving circuit, is connected to the electrode pattern 200, includes a pattern in which '/\' and '\/' are alternately continuous so as not to be parallel to the outline of the substrate 100, and is disposed along the outline of the substrate 100. Accordingly, most of the wired electrode for the touch screen panel according to the present invention is adjacent to the outline of the substrate 100 to be formed in a zigzag pattern.

FIGS. 11 and 12 are partially enlarged diagrams of FIG. 10, and illustrate enlarged areas B and C of FIG. 10, respectively. The wired electrode 300 for the touch screen panel according to the present invention is configured to include a contact unit 320 electrically connected with the electrode pattern 200, a bonding unit 340 transmitting a touch signal detected in the electrode pattern 200 by contacting an external driving circuit (not illustrated), and a signal line unit 360 including a zigzag pattern connecting the contact unit 320 and the bonding unit 340. Since the contact unit 320 and the bonding unit 340 are the same as those of the first exemplary embodiment of the touch screen panel according to the present invention, the duplicated description is omitted.

Similarly to the first exemplary embodiment, the signal line unit 360 may be divided into a first signal line 362 connected to the contact unit 320 and a second signal line 364 connected between the first signal line 362 and the bonding unit 340. In this case, the first signal line 362 may be constituted by a conductive grid which is not parallel to the outline of the substrate 100 (so that the intaglio pattern is oblique to the carrying direction of the base when the conductive material is filled).

The second signal line 364 is formed to include a zigzag pattern along the outline of the substrate 100. In this case, one end of the second signal line 364 connected with the first signal line 362 protrudes from the first signal line 362 to form a protruding end 363. The reason why the protruding end 363 is formed is that in the case where the static electricity is generated when the touch screen panel is used and manufactured, discharging occurs in the protruding end 363 if possible (because charges are collected in a cusp) to prevent the conductive material from being lost according to the electrostatic discharging in the signal line unit 360 (disconnection or a change in resistance may be involved instead of the disconnection). The second signal line 364 may be prevented from being deviated from the substrate 100 by filling the intaglio pattern with a protrusion P (the upper end of the protrusion serves to fix the conductive material forming the second signal line by protruding above the second signal line).

The touch screen panel according to the present invention is constituted by the substrate 100, the electrode pattern 200, and the wired electrode 300 formed to include a zigzag pattern along the outline of the substrate 100, and may further include a resistance measuring terminal 400, a ground electrode 500, and a discharging electrode 600.

Since the substrate 100 is the same as that of the first exemplary embodiment of the touch screen panel according to the present invention, the duplicated description is omitted.

The electrode pattern 200 is provided on the substrate 100 to detect a touch signal of the user, and an intaglio formed on the electrode pattern 200, may be formed so as not to be parallel to the outline of the substrate 100 (like the first signal line, the intaglio pattern is oblique to the carrying direction of the base when the conductive material is filled).

The wired electrode 300 is configured to include a contact unit 320 electrically connected with the electrode pattern 200, a bonding unit 340 transmitting a touch signal detected in the electrode pattern 200 by contacting an external driving circuit (not illustrated), and a signal line unit 360 including a zigzag pattern connecting the contact unit 320 and the bonding unit 340, as described above.

The resistance measuring terminal 400 is the same as that of the first exemplary embodiment of the touch screen panel according to the present invention. However, since the resistance measuring terminal 400 may be used for electrostatic discharging according to a connection relationship with the discharging electrode 600, the resistance measuring terminal 400 may have a sharp tip 460.

The ground electrode 500, as a constituent element for supplying a ground voltage during discharging of static electricity during manufacturing and an operation of the touch screen panel, is constituted by including the zigzag pattern (the reason is the same as the reason why the wired electrode is formed to include the zigzag pattern). When the ground electrode 500 is formed at the outermost side of the substrate 100, that is, the outside of the electrode pattern 200, the wired electrode 300, the resistance measuring terminal 400, and the discharging electrode 600, it is advantageous in terms of a displacement relationship with other constituent elements.

When a side end which is not connected with the wired electrode 300 of the electrode pattern 200, that is, an end connected with the wired electrode 300 of two ends of the electrode pattern 200 is one end, the discharging electrode 600 is formed at the other end to discharge static electricity induced from the electrode pattern 200. Accordingly, a sharp tip 620 may be included so that electrostatic discharging is easy. The discharging electrode is disposed to face the electrode pattern 200, or disposed to face the resistance measuring terminal 400 in the case where the resistance measuring terminal 400 is provided. When a tip 460 is provided on the resistance measuring terminal 400, when a tip 620 of the discharging electrode 600 and a tip 460 of the resistance measuring terminal 400 face each other, it is advantageous in terms of discharging. However, for convenience of manufacturing, as illustrated in FIG. 12, the tip 620 of the discharging electrode 600 and the tip 460 of the resistance measuring terminal 400 may be mismatched to each other by cutting the electrode of a grid pattern. An exemplary embodiment of a touch screen panel that may effectively prevent the disconnection of the wired electrode in addition to an increase in manufacturing efficiency of the touch screen panel will be briefly described.

FIGS. 13A and 13B illustrate another manufacturing method of a touch screen panel according to the present invention. The touch screen panel according to the present invention includes a substrate 100, an electrode pattern 200, and a wired electrode 300, and the electrode pattern 200 is filled in the intaglio pattern and the wired electrode 300 may be embossed. The manufacturing method of the touch screen panel according to the present invention includes a step of forming an electrode pattern of forming a plurality of electrode patterns by filling a conductive material in an intaglio pattern formed on the substrate, and a step of forming a wired electrode of forming a wired electrode connected with each of the plurality of electrode patterns on the substrate. In this case, it is convenient on the process that the forming of the electrode pattern is performed by a roll-to-roll method in which the electrode pattern is formed on the substrate wound around a roll and again wound around the roll.

As described above, when the intaglio pattern is vertical or horizontal to the carrying direction of the base, the filling of the conductive material is not performed well in many cases, and as a result, in the forming of the electrode pattern, the electrode pattern 200 is formed by a method of filling the conductive material in an existing intaglio pattern, and in the forming of the wired electrode, the wired electrode 300 is embossed by any one method selected from screen printing (photosensitive film printing), jet printing, gravure printing, and photolithography after forming the electrode pattern 200, thereby solving a filling defect problem of the conductive material. There is an advantage in that it is easy to change the design according to the need in the case of the configuration. That is, the electrode pattern 200 in which a shape and a configuration are standardized is formed by using the intaglio pattern by molding or a mold, and the wired electrode 300 which is variable according to a product design (for example, even the same 21-inch monitor, various models exist, and shapes of the wired electrodes are different from each other for each model) is embossed by changing the design, and as a result, it is easy to respond to various needs. Since the wired electrode 300 is embossed, the wired electrode 300 may be formed in a linear shape, not the zigzag shape.

Hereinabove, as the constituent elements of the touch screen panel, the wired electrode 300 including the zigzag pattern formed along the outline of the substrate 100 and the ground electrode 500 are described, but the electrode structure of the zigzag pattern formed along the outline of the substrate may be applied to all electrodes formed by filling the conductive material in the intaglio.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A touch screen panel, comprising:
a substrate;
a plurality of electrode patterns formed on the substrate to generate a touch signal;
a plurality of wired electrodes connected to the plurality of electrode patterns, respectively; and
a ground electrode disposed at the outermost side of the substrate,
wherein each of the plurality of wired electrodes is connected to a corresponding one of the plurality of electrode patterns, disposed along an outline of the substrate, disposed in an area that is different from an area of the corresponding electrode pattern, and formed by filling a conductive material in an intaglio pattern with a protrusion,
wherein the plurality of wired electrodes are formed in a zigzag pattern,
wherein an upper end of the protrusion protrudes above the plurality of wired electrodes,
wherein the outline of the substrate and the plurality of wired electrodes are not parallel to each other, and
wherein the ground electrode is filled with a conductive material in an intaglio pattern.

2. The touch screen panel of claim 1, wherein a separation distance d of the plurality of the wired electrodes satisfies the following Equation (w is a line width of each of the plurality of the wired electrodes), and the line width of the wired electrodes are formed to 100 μm or less $$d \geq w \times 0.5 \qquad \text{[Equation]}$$

3. The touch screen panel of claim 1, wherein one end of a first one of two neighboring wired electrodes protrudes to form a first protruding end and one end of a second one of the two neighboring wired electrodes protrudes to form a second protruding end, and wherein the first protruding end and the second protruding end are disposed without facing toward each other as a pair, and no static current is transmitted from the first protruding end to the second protruding end.

4. The touch screen panel of claim 1, further comprising:

a resistance measuring terminal electrically connected to the other end of the electrode pattern.

5. The touch screen panel of claim 4, wherein the resistance measuring terminal, in which a plurality of terminal lines is spaced apart from each other at predetermined intervals to be formed in parallel, is connected to a contact surface of the electrode pattern.

6. The touch screen panel of claim 1, wherein the ground electrode is formed in a zigzag pattern and has a mesh type.

* * * * *